US011246692B2

(12) United States Patent
Jonker, Jr. et al.

(10) Patent No.: US 11,246,692 B2
(45) Date of Patent: Feb. 15, 2022

(54) SYSTEM AND METHOD FOR CONTAINING AND TRANSPORTING DENTAL WASTE

(71) Applicant: Anterior Quest LLC, Jenison, MI (US)

(72) Inventors: Dennis G. Jonker, Jr., Hudsonville, MI (US); Daniel H. Holtrop, Hudsonville, MI (US)

(73) Assignee: Anterior Quest LLC, Jenison, MI (US)

( * ) Notice: Subject to any disclaimer, the term of this patent is extended or adjusted under 35 U.S.C. 154(b) by 408 days.

(21) Appl. No.: 16/299,655

(22) Filed: Mar. 12, 2019

(65) Prior Publication Data
US 2020/0289244 A1  Sep. 17, 2020

(51) Int. Cl.
*A61C 17/06* (2006.01)
*A61C 19/00* (2006.01)
*A61C 17/02* (2006.01)
*C02F 101/20* (2006.01)

(52) U.S. Cl.
CPC ........ *A61C 17/065* (2019.05); *A61C 17/0208* (2013.01); *A61C 19/00* (2013.01); *C02F 2101/20* (2013.01)

(58) Field of Classification Search
CPC .... A61C 17/065; A61C 17/0208; A61C 19/00
See application file for complete search history.

(56) References Cited

U.S. PATENT DOCUMENTS

| | | | | |
|---|---|---|---|---|
| 5,797,742 A * | 8/1998 | Fraker | ................ | A61C 17/065 433/92 |
| 6,592,769 B1 * | 7/2003 | Erickson | ............ | B01D 21/0003 210/801 |
| 6,638,066 B2 * | 10/2003 | Hubner | ................ | A61C 17/065 433/92 |
| 6,692,636 B2 * | 2/2004 | Chilibeck | .......... | B01D 21/0012 210/137 |
| 7,182,599 B2 * | 2/2007 | Stone | .................. | A61C 17/065 433/92 |
| 7,927,482 B1 | 4/2011 | Luke et al. | | |
| 9,091,367 B2 * | 7/2015 | Waldor | .................. | F16K 31/44 |
| 2011/0233116 A1 * | 9/2011 | Moe | ....................... | B01D 35/14 210/86 |

* cited by examiner

*Primary Examiner* — Ralph A Lewis
(74) *Attorney, Agent, or Firm* — Warner Norcross + Judd LLP

(57) ABSTRACT

A dental waste containment system having a treatment stage to reduce the contaminant levels of the stored fluid. The treatment stage may include a settling canister disposed before the fluid storage reservoir to remove and contain at least some solid contaminants from the fluid waste before the fluid waste is moved into storage. The system may include a bypass subcircuit to allow fluid waste to selectively bypass the treatment stage. The present invention also provides a method of collecting, containing and transporting dental waste that includes separate containment of solid and fluid dental waste. The method includes at least partial separation and containment of solid contaminants in the treatment stage before the fluid dental waste is moved into separate storage. The accumulated fluid dental waste and accumulated solid waste may be separately collected from the system and separately transported to a remote facility for treatment, reclamation and/or disposal.

2 Claims, 5 Drawing Sheets

SYSTEM AND METHOD FOR CONTAINING AND TRANSPORTING DENTAL WASTE

BACKGROUND OF THE INVENTION

The present invention relates to systems and methods for collecting, containing and transporting dental waste for transport to subsequent treatment and/or disposal.

Many dental service facilities generate contaminated waste that is not suitable for release into sewer lines. For example, a variety of conventional dental services, such as teeth cleaning, filling installation, filling replacement and other chair-side procedures, can result in the release of dental amalgams into wastewater. The released dental amalgams often contain mercury and other metals that are generally consider contaminants. With typical dental amalgams, approximately half of the filling is mercury and approximately half is a powered alloy of copper, silver and tin. Given that mercury is bioaccumulative, mercury can prevent enhanced health risks even when repeatedly encountered in small amounts over time.

In view of the concerns associated with contaminated dental waste, a variety of systems and methods have been developed for collecting, containing and transporting dental waste resulting from chair-side procedures. For example, U.S. Pat. No. 7,927,482, which is entitled METHOD AND SYSTEM FOR CONTAINING AND REMOVING DENTAL WASTE and issued to Luke et al on Apr. 19, 2011, presents a particularly effective solution for addressing the issue of contaminants in dental waste. Dental waste containment systems allow dental waste to be collected in a fluid storage system at the dental service facility rather than release into the sewer line. The contained fluid waste is periodically collected and transported offsite for treatment and/or disposal. For example, a transport truck with a fluid waste tank may travel between a number of dental service facilities and collect the contained dental waste in a transport vessel, such as a large tank. While waste containment systems and the associated methods of collection and transportation are a marked improvement over the release of dental waste into the sewer line, it is possible for the contaminant levels of the transported dental waste to be higher than desired. This can create heightened concern when collecting transporting dental waste. Further, some jurisdictions have governmental regulations that specify the maximum contaminant levels that can be permissibly transported using the types of truck transportation associated with conventional methods for containing and transporting liquid dental waste.

Although known methods and systems for collecting, containing and transporting dental waste are significant advancements, there continues to be a need to improve reliability, to extend service life and to enhance consistency with current government regulations relating to the transportation of contaminated materials without unduly increasing cost or complexity.

SUMMARY OF THE INVENTION

The present invention provides a dental waste containment system that includes an on-site fluid storage system with a treatment stage configured to reduce the contaminant levels of the stored fluid. In one embodiment, the treatment stage is disposed before the fluid storage system to remove at least some portion of solid contaminants from the fluid dental waste before the fluid dental waste is moved to the primary containment reservoir. For example, in one embodiment, the treatment stage is disposed along the dental waste input line upstream from the primary containment reservoir.

In one embodiment, the treatment stage is arranged in parallel with a bypass subcircuit to allow fluid dental waste to selectively bypass the treatment stage. The bypass subcircuit allows the system to continue to operate and accumulate fluid dental waste even when the treatment stage is being serviced and/or replaced. This facilitates servicing of the treatment stage during times when the dental services facility is operating.

In one embodiment, the treatment stage is a settling canister that collects contaminants and other particulate matter of sufficient density to settle out of the fluid dental waste. The settling canister may include an inlet, an outlet and one or more internal baffles configured to define an internal fluid flow path that facilitates settling of solid contaminants from the fluid dental waste. The settling canister of one embodiment is a removable canister that has a cap with an inlet and an outlet that are coupled to the dental waste containment system. More specifically, the cap may include a fluid inlet that allows fluid dental waste to flow into the canister and a fluid outlet that allows fluid dental waste with reduced contaminants to pass from the canister for containment.

In one embodiment, the bypass subcircuit is associated with the cap of the canister. The bypass may include a bypass conduit and three-way valve capable of being actuated (e.g. manually or through automation) to selectively route incoming fluid dental waste through the settling canister or through the bypass conduit to bypass the canister.

In another aspect, the present invention provides a method of collecting, containing and transporting dental waste that includes at least partial separation, containment and transportation of contaminants and fluid dental waste. In one embodiment, the method includes the steps of: (a) passing fluid dental waste through a treatment stage to remove and contain at least a portion of the contaminants suspended in the fluid dental waste; (b) routing the fluid dental waste with reduced contaminants to a fluid containment reservoir; (c) periodically removing the accumulated fluid dental waste from the containment reservoir and transporting the fluid dental waste to an offsite facility for treatment and/or disposal; and (d) periodically removing the accumulated contaminants from the treatment stage and transporting the accumulated contaminants separately from the accumulated fluid dental waste to an offsite facility for treatment and/or disposal.

In one embodiment, the treatment stage includes a settling canister and the step of passing the fluid dental waste through a treatment stage may be further defined as passing raw fluid dental waste through a settling canister, whereby at least a portion of the contaminants suspended in the raw fluid dental waste settle out of the fluid and accumulate in the canister, and passing the effluent of the settling canister to a fluid containment reservoir for separate storage.

In one embodiment, the method may include the further steps of: (a) periodically causing the raw fluid dental waste to bypass the treatment stage; and (b) servicing and/or replacing the treatment stage or a component of the treatment stage while the dental waste containment system continues to operate with the raw fluid dental waste bypassing the treatment stage.

In one embodiment, the treatment stage may include a settling canister coupled to the dental waste containment system. The canister may include a cap with an inlet and an outlet that are configured so that the canister can be easily removed from the system with the accumulated solids and transported to a remote facility for treatment and/or disposal.

The present invention provides a cost-effective improvement to systems and methods for collecting, transporting and treating/disposing of dental waste. The treatment stage allows at least partial separation of solid contaminants from the fluid dental waste, thereby reducing the contaminant level in the relatively high-volume of accumulated fluid dental waste. In applications incorporating the use of a settling canister, the treatment stage is inexpensive and provides more than adequate separation without the need to slow fluid dental waste collection. Additionally, in some applications, the system may include an accumulator tank and a storage tank that are separated by a ball check valve. The use of a settling canister helps to remove solids that might otherwise clog or interfere with proper operation of the check valve. Further, the method of separately collecting and transporting the accumulated fluid dental waste and the accumulated solid dental waste facilitates compliance with applicable governmental regulations. More specifically, the method reduces the contaminant level of the fluid dental waste, which is beneficial in view of governmental regulations relating to permissible contamination levels associated with the transportation of high-volume fluid waste. At the same time, the method provides sufficiently low volumes of accumulated solid waste that transportation of the accumulated solids separate from the fluid waste can be achieved consistent with governmental regulations relating to transportation of solid contaminant waste.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

DESCRIPTION OF THE CURRENT EMBODIMENT

Overview.

Figure 1:
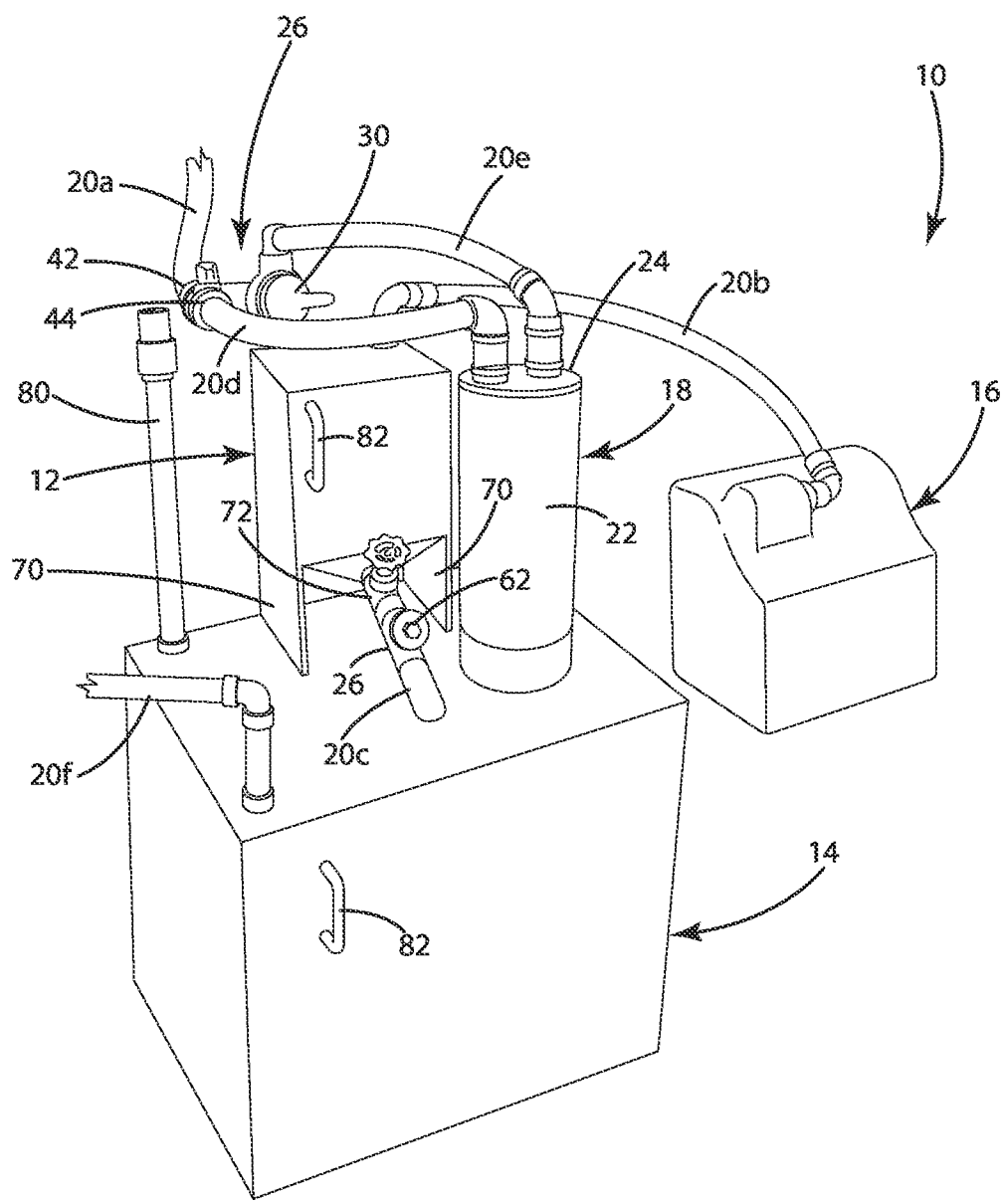
FIG. 1 is a perspective view of a dental waste containment system in accordance with an embodiment of the present invention.
Figure 2:
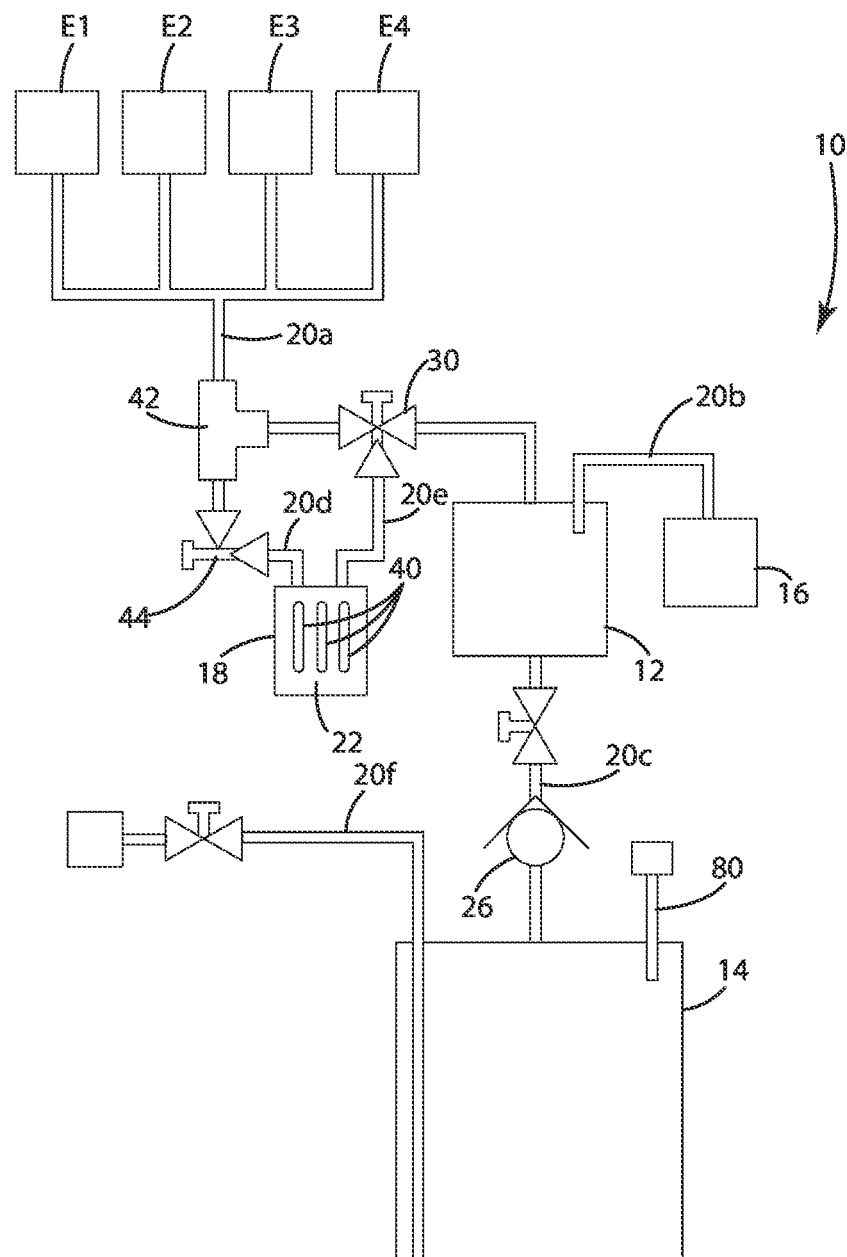
FIG. 2 is a circuit diagram of the flow circuit for the dental waste containment system.

A dental waste containment system in accordance with an embodiment of the present invention is shown in FIG. 1. The illustrated system 10 generally includes an accumulator tank 12, a storage tank 14, a vacuum pump 16, a treatment stage 18 and a network of conduits or flow lines 20a-f that interconnect the various components of the system 10 as described in more detail below (See also FIG. 2). In this embodiment, the treatment stage 18 is situated before the accumulator tank 12 and includes a settling canister 22 that allows at least a portion of the solids suspended in the fluid dental waste to settle out of the fluid and remain in the canister 22. As a result, the fluid dental waste leaves the treatment stage 18 and is stored in the dental waste with a reduced contaminant level. When sufficient solids have accumulated in the settling canister 22 (or periodically), the settling canister 22 can be removed and transported to a remote facility for treatment and/or disposal of the accumulated solids. Alternatively, the accumulated solids can be cleaned from the settling canister 22 and the settling canister 22 can remain in place in the system 10. As perhaps best shown in FIGS. 3A and 3B, the settling canister 22 includes a cap 24 with an inlet 38 and an outlet 40 that configured to connect to the dental waste containment system 10 by fluid lines (as described in more detail below). For example, in the illustrated embodiment, the canister inlet line 20d is secured to the cap inlet 38 and the canister return line 20e is secured to the cap outlet 40 by hose clamps (or other clamps) for easily installing and removing the settling canister 22. The cap 24 may be associated with a bypass subcircuit 26 that allows fluid dental waste to bypass the treatment stage 18 when service is being performed on the treatment stage 18, for example, when the settling canister 22 is being replaced or emptied. The present invention also provides a method for collecting, containing and transporting dental waste. In one embodiment implemented with the dental waste containment system 10 of FIG. 1, the method includes the steps of: (a) drawing fluid dental waste into the dental waste containment system; (b) passing fluid dental waste through a treatment stage 18 to remove and contain at least a portion of the solid contaminants suspended in the fluid dental waste; (b) routing the fluid dental waste with reduced contaminants to the accumulator tank 12, (c) periodically routing the fluid dental waste from the accumulator tank 12 to the storage tank 14, (d) periodically removing the accumulated fluid dental waste from the storage tank 14 and transporting the fluid dental waste to an offsite facility for treatment and/or disposal; and (e) periodically removing the accumulated contaminants from the treatment stage 18 and transporting the accumulated contaminants separately from the accumulated fluid dental waste to an offsite facility for treatment and/or disposal.

The present invention is described in the context of an exemplary dental waste containment system that incorporates dual fluid storage tanks. The present invention may, however, be implemented in a variety of alternative systems that include one or more fluid containment reservoirs and are capable of incorporating a treatment stage. U.S. Pat. No. 7,927,482, which is entitled METHOD AND SYSTEM FOR CONTAINING AND REMOVING DENTAL WASTE and issued to Luke et al on Apr. 19, 2011, is incorporated herein by reference in its entirety.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

Dental Waste Containment System.

The dental waste containment system 10 is configured to capture dental waste produced at a dental facility. In typical implementations, the dental waste containment system 10 is connected to dental service equipment in the patient rooms and includes a vacuum source 16 to draw dental waste from the rooms into the dental waste containment system 10. For example, the dental waste containment system 10 may be coupled to the vacuum line of dental equipment E1-E4, such as saliva ejectors and other dental evacuation devices, used in suctioning dental waste, such as amalgam, saliva and or blood from a patient's mouth, or to the drain line of dental cuspidors and spittoons into which a patient may spit during the performance of dental services (See FIG. 2). Generally, the dental waste containment system separates at least a portion of the solid contaminants from the fluid waste and separately contains the separated solids from the fluid waste. The accumulated solids and accumulated fluid waste can be separately removed from the dental waste containment system 10 and separately transported to a remote facility for treatment, disposal and/or reclamation. For example, the accumulated fluid waste can be pumped from the storage tank 14 into a transport vehicle and driven to the remote facility, while the settling canister 22 with accumulated solids can be removed from the system 10 and transported to the remote facility, with a replacement settling canister 22 installed in its place.

The dental waste containment system 10 of the illustrated embodiment generally includes a first fluid storage reservoir or accumulator tank 12, a second fluid storage reservoir or storage tank 14, a vacuum source or vacuum pump 16 and a treatment stage 18 that includes a settling canister 22. In this embodiment, the accumulator tank 12 is used as an initial storage reservoir for the fluid dental waste and the storage tank 14 is used as a long-term storage reservoir. During typical operation, fluid dental waste will accumulate in the accumulator tank 12 during operational hours of the dental facility. After the facility is closed and the dental equipment is shut-off for the evening, the fluid waste that has accumulated in the accumulator tank 12 is transferred to the storage tank 14. The fluid waste may, however, be transferred from the accumulator tank 12 more or less frequently, if desired. The sizes of the accumulator tank 12 and the storage tank 14 may vary from application to application. In the illustrated embodiment, the accumulator tank 12 has sufficient capacity to hold approximately one week's worth of dental waste, which may vary from application to application depending on the size and nature of the dental services facility. In typical applications, the accumulator tank 12 may have a storage capacity of approximately five to ten gallons of fluid, while the storage tank 14 may have sufficient capacity to hold multiple days' worth of liquid dental waste. For example, in typical applications, the storage tank 14 may have sufficient capacity to store three months' to six months' worth of liquid dental waste, which may be 90 to 180 times greater than the capacity of the accumulator tank 12 (or approximately 30 to 120 gallons of fluid). The volumes of the accumulator tank 12 and the storage tank 14 may vary depending on the daily volume of liquid waste and the desired interval between periodic emptying of the storage tank 14. Custom tanks can be built to any size. In the illustrated embodiment, the accumulator tank 12 and the storage tank 14 are generally rectangular tanks manufactured from stainless steel or other suitable materials. The bottom of the accumulator tank 12 may be tapered to provide a funnel-like structure that facilitates transfer or more fluid to the storage tank 14. In this embodiment, the storage tank 14 includes a vent 80 that allows air flow into the storage tank 14 as the tank 14 is emptied during removal of accumulated fluids. The vent 80 may include a vertically extending pipe with an open, but shrouded upper end. Although the illustrated embodiment includes a dual-tank arrangement, the present invention may be incorporated into alternative systems that include a single tank or that include more than two tanks.

In the illustrated embodiment, the dental waste containment system 10 includes a plurality of fluid conduits 20 interconnecting the various components. As discussed in more detail below, this includes a plurality of fluid conduits 20a-f that route fluid dental waste and/or air through the system 10. For example, the system 10 includes an inlet conduit 20a that connects the various waste sources in the patient rooms, such as the dental equipment and dental cuspidors discussed above, to the settling canister 22, the accumulator tank 12 and the storage tank 14. Any number of splitters, manifolds and other plumbing components may be provided to operatively couple the waste sources with the settling canister 22, the accumulator tank 12 and the storage tank 14. The system 10 also include a disposal conduit 20f through which accumulated fluid dental waste is removed from the storage tank 14. As described in more detail below, the dental waste containment system 10 is configured to be periodically emptied by removing the fluid dental waste that has accumulated in the storage tank 14. To facilitate this removal, the disposal conduit 20f may be configured to extend from the base of the storage tank 14 to a remote access location outside the dental services facility. For example, the disposal conduit 20f may extend from the dental waste containment system 10 to a location on the exterior of the facility that is accessible with a fluid transport vehicle (not shown). In use, the transport vehicle may connect to the accessible end of the disposal conduit 20f and pump the accumulated fluid waste from the storage tank 14 into a tank on the transport vehicle. The remote end of the disposal conduit 20f may be closed with a locking cap that prevent tampering.

In the illustrated embodiment, the vacuum pump 16 is coupled to the accumulator tank 12 by vacuum conduit 20b and is operated to draw fluid dental waste into the dental waste containment system 10. The vacuum pump 16 of this embodiment is connected to the accumulator tank 12 by a vacuum line 20b. In operation, the vacuum pump 16 draws air out of the accumulator tank 12 via vacuum line 20b, thereby creating a partial vacuum within the accumulator tank. The partial vacuum draws fluid from the dental service equipment spread throughout the facility to the dental waste containment system 10 via inlet conduit 20a. The vacuum source of the illustrated embodiment is a vacuum or suction pump 16. The vacuum pump 16 is selected and operated to provide a flow rate that gives the fluid dental waste the appropriate dwell time in the settling canister 22 to settle out an adequate amount of solid contaminants. For example, the vacuum pump 16 may be a RamVac VFD model pump available from Dental EZ operating at the desired liquid flow rate.

Figure 4:
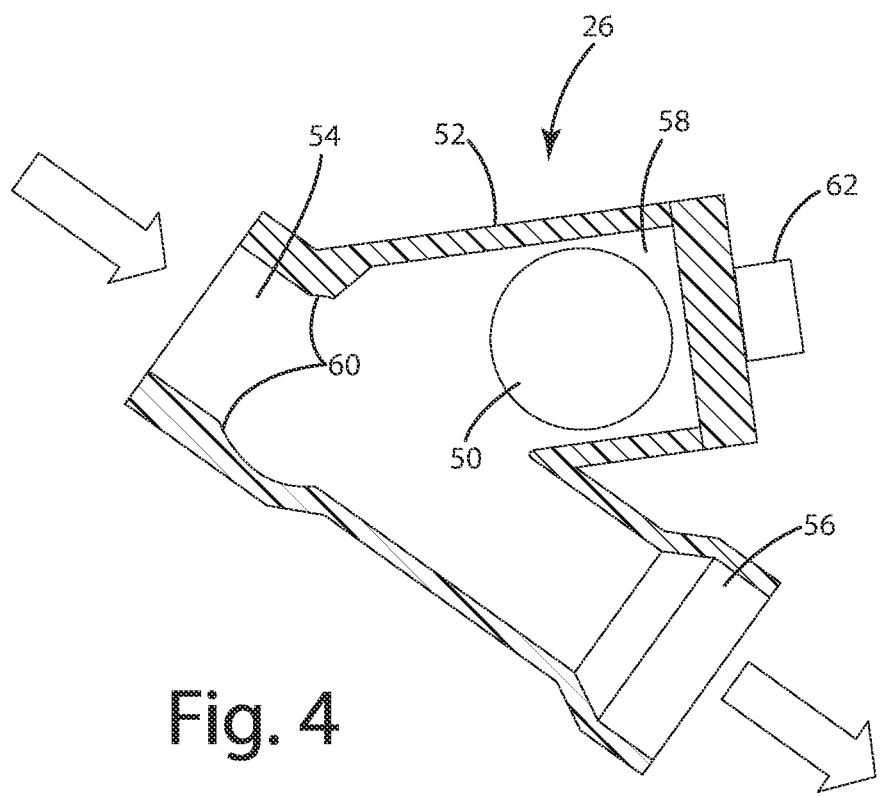
FIG. 4 is a representational view of the ball check valve in the open position.

As noted above, the system 10 is configured to initially store fluid waste in the accumulator tank 12 and then to transfer the fluid waste to the storage tank 14. In the illustrated embodiment, the tanks are arranged to allow this transfer to occur by gravity. More specifically, the accumulator tank 12 is situated above the storage tank 14. As shown in FIG. 1, the accumulator tank 12 is mounted atop the storage tank 14 upon supports 70. In this embodiment, two vertical supports 70 are affixed to and extend upwardly from the storage tank 14. The accumulator tank 12 is secured to the supports 70, for example, by fasteners. In the illustrated embodiment, a transfer conduit 20c extends between the accumulator tank 12 and the storage tank 14 to provide a fluid flow path from the accumulator tank 12 to the storage tank 14. As shown, the transfer conduit 20c is angled downwardly to facilitate movement of the fluid waste from the accumulator tank 12 to the storage tank 14 by gravity. The angle of the transfer conduit 20c may be between approximately 55 and approximately 65 degrees from horizontal, and is in the illustrated embodiment approximately 60 degrees. A check valve 26 is situated in transfer conduit 20c. The check valve 26 is arranged to close in response to lower pressure in the accumulator tank 12 to prevent fluid dental waste from flowing from the accumulator tank 12 to the storage tank 14 while the vacuum pump 16 is running. In the illustrated embodiment of FIGS. 4 and 5, the check valve 26 is a ball check valve (but could alternatively be another form or type of check valve) having a ball 50 seated within a somewhat Y-shaped housing 52 with an inlet portion 54, an outlet portion 56 and a ball portion 58. As shown, the inlet portion 54 and the outlet portion 56 are aligned in a generally linear arrangement, and the ball portion 58 extends therefrom at an upward angle. The inlet end 54 of the housing defines a ball seat 60 against which the ball 50 will seal when there is a partial vacuum in the accumulator tank 12. The ball portion 58 provides a space to contain the ball 50 when the accumulator tank 12 is not under partial vacuum. In the illustrated embodiment, the ball portion 58 is closed by a removable cap 62 that is threadedly secured to the housing 52. The removable cap 62 allows the check valve 26 to be opened for cleaning and other forms of maintenance.

Figure 5:
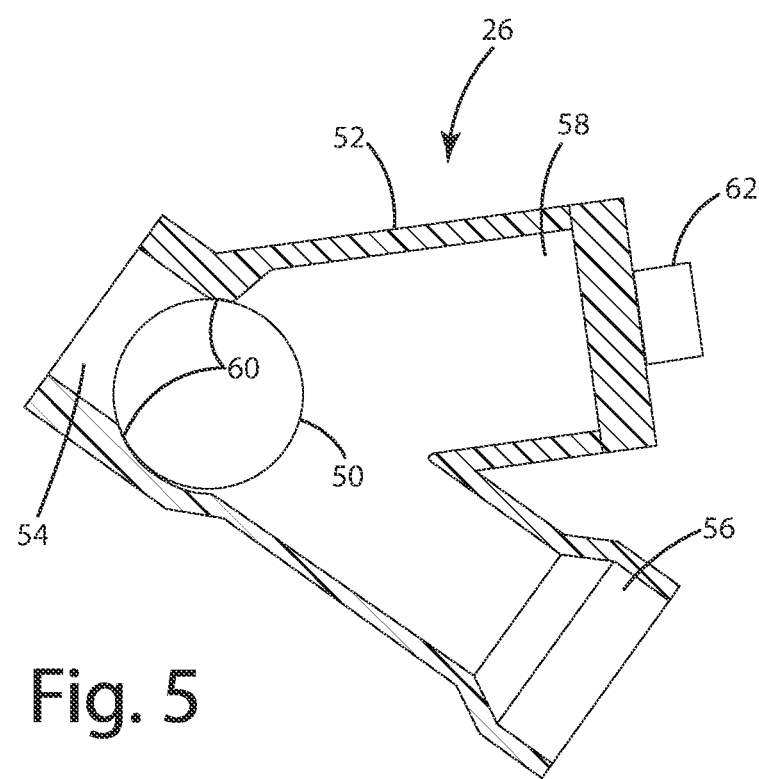
FIG. 5 is a representational view of the ball check valve in the closed position.

When the vacuum pump 16 is operating it creates lower pressure at the inlet portion 54, which draws the ball 50 into the ball seat 60 to close the check valve 26 and prevent fluid waste from flowing from the accumulator tank 12 to the storage tank 14 (See FIG. 5). When the vacuum pump 16 is not operating, there is no pressure differential to hold the ball 50 against the ball seat 60. As a result, the ball 50 is free to move up into the ball portion 58 as the gravity causes fluid dental waste from the accumulator tank 12 to transfer to the storage tank 14 (See FIG. 4).

In the illustrated embodiment, a valve is disposed in the transfer conduit 20c upstream from check valve 26 to allow the transfer conduit 20c to be selectively closed prior to the check valve 26. In this embodiment, the valve is a gate valve 72 that can be closed to prevent the flow of fluid from the accumulator tank 12 to the check valve 26 and the storage tank 14. This may be done, for example, to allow a user to clean or otherwise perform maintenance on the check valve 26. The gate valve 72 may be a conventional, manually operated gate valve that can be opened and closed through manual actuation of a control lever or control knob. The gate valve 72 is optional and may be eliminated or replaced by other types of valves capable of selectively closing the transfer conduit 20c. In alternative embodiment, the check valve 26 may be eliminated and the gate valve 72 may be opened when it is desirable to transfer fluid from the accumulator tank 12 to the storage tank 14. For example, operation of the gate valve 72 (or alternative valve) may be automated and the system 12 may be configured to open the gate valve 72 periodically, such as whenever the vacuum pump 16 is not running.

As noted above, the dental waste containment system 10 includes a treatment stage 18 configured to separate at least a portion of the contaminants from the fluid dental waste. In the illustrated embodiment, the treatment stage 18 includes a settling canister 22 that allows solid waste to settle out of the fluid waste. The settling canister 22 is, in this embodiment, situated between the dental waste sources and the accumulator tank 12 so that fluid waste is treated before entering the accumulator tank 12. For example, as perhaps best shown in FIG. 2, the settling canister 22 is coupled between the inlet conduit 20a and the accumulator tank 12 so that fluid dental waste drawn into the system 10 flows through the settling canister 22 before reaching the accumulator tank 12. The settling canister 22 is a generally conventional settling canister having a housing 23 with an inlet 38, an outlet 40 and one or more internal baffles (not shown). The settling canister 22 may have a capacity selected to provide fluid dental waste moving through the system 10 with adequate dwell time in the settling canister 22 to allow a sufficient amount of solids to settle out of the fluid. The capacity of the settling canister 22 may vary from application depending on the volume of fluid dental waste passing through the system 10 over time and the desired amount of time between replacements and/or cleaning of the canister 22. In a typical application, the capacity of the settling canister 22 is likely to be in the range of at least two to three gallons, which will continue to provide adequate dwell time even as the canister 22 begins to fill with solids. It is desirable for the settling canister 22 to be emptied or replaced before the remaining fluid capacity (as reduced by the presence of accumulated solids) is too low to provide adequate dwell time. In typical applications, the capacity of the settling canister 22 is selected to provide 10-12 months between replacements and/or cleanings.

In this embodiment, the system 10 includes a bypass subcircuit 26 that allows fluid dental waste to bypass the treatment stage 18. The bypass subcircuit 26 includes a bypass valve 30 installed between inlet conduit 20a and the accumulator tank 12 so that fluid dental waste drawn into the system 10 can, depending on the position of the bypass valve 30, either flow through the settling canister 22 before reaching the accumulator tank 12 or flow directly to the accumulator tank 12 bypassing the settling canister 22. In this embodiment, the bypass valve 30 is a manually-actuated three-way valve with a first inlet 32, a second inlet 34, an outlet 36 and an internal valve arrangement that selectively coupled either the first inlet 32 or the second inlet 34 to the outlet 36. As shown, a canister inlet line 20d may extend between the first inlet 32 of the bypass valve 30 and the inlet 38 of the settling canister 22, and a canister return line 20e may extend between an outlet 40 of the settling canister 22 and the second inlet of the bypass valve 30. In this embodiment, the system 10 includes a T-fitting 42 coupled that is coupled to first inlet of the bypass valve 30, the inlet conduit 20a and the canister inlet line 20d. An optional on/off valve 44 may be disposed between the treatment stage valve and the canister inlet 38, for example, between the T-fitting 42 and the canister inlet line 20*d*. In operation, the on/off valve 44 may be closed to isolate the settling canister 22 from the system 10.

Figure 3A:
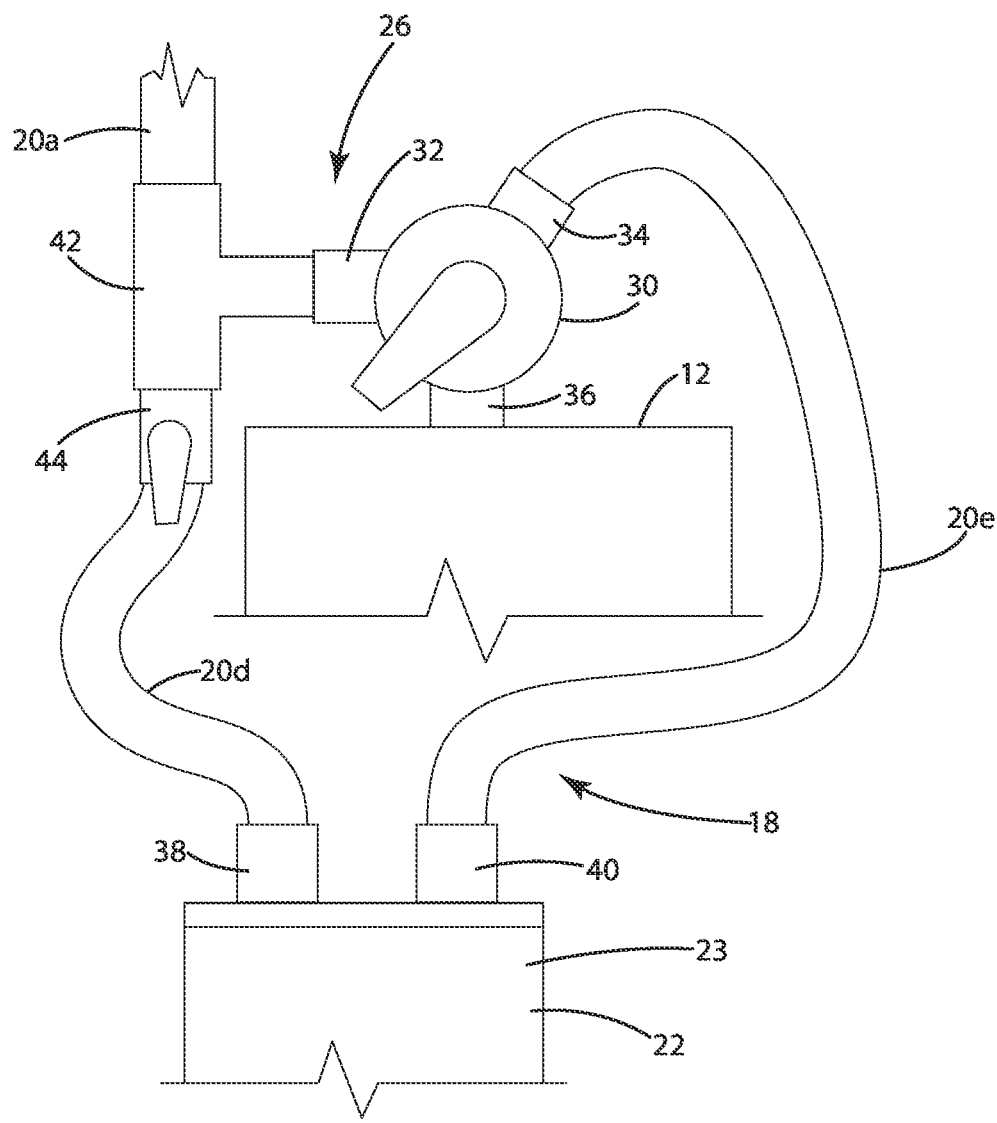
FIG. 3A is a perspective view of the treatment stage during treatment mode.
Figure 3B:
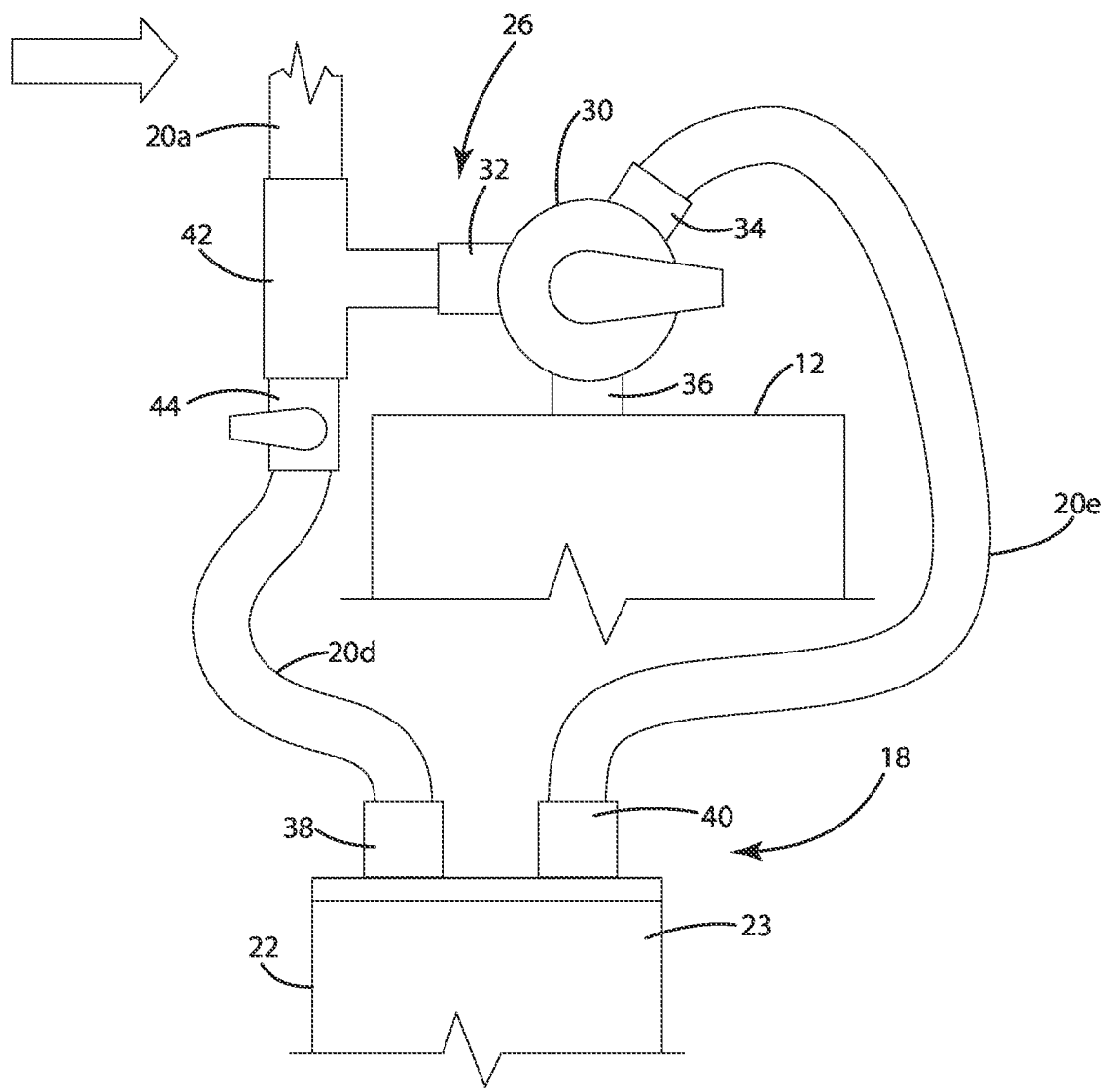
FIG. 3B is a perspective view of the treatment stage during bypass mode.

When the bypass valve 30 is in the operational position, the internal valve arrangement closes the first inlet 32 of the bypass valve 30 and couples the second inlet 34 of the bypass valve 30 to the outlet 36 of the bypass valve 30 (and consequently the interior of the accumulator tank 12) (See FIG. 3A). As a result, the partial vacuum within the accumulator tank 12 draws fluid from the inlet conduit 20*a* through the T-fitting 42 to the canister inlet line 20*d*, and then to the settling canister 22 where a portion of the suspended solids settle from the fluid waste and remain contained in the settling canister 22. From the settling canister 22, the fluid waste with reduced contaminants is drawn through the canister return line 20*e*, the second inlet 34 of the bypass valve 30 and finally through the outlet 36 of the bypass valve 30 into the accumulator tank 12. When the bypass valve 30 is in the bypass position, the second inlet 34 is closed, and the first inlet 32 is coupled to the outlet 36 (See FIG. 3B). As result, fluid dental waste is drawn from inlet conduit 20*a*, into the first inlet 32 through the valve arrangement and finally though the outlet 36 into the accumulator tank 12. The on/off valve 44 may be closed to prevent the possibility of liquid waste being drawn backward from the settling canister 22 into the accumulator tank 12 along the canister inlet line 20*d*.

As shown in FIG. 1, the accumulator tank 12 and the storage tank 14 may include a transparent sight glass 82 (or transparent sight tube) positioned toward the top of the corresponding tank. In use, each sight glass 82 will show fluid when the level of fluid in the corresponding tank is at or above the level of the sight glass 82. This allows a user to determine with a quick visual inspection whether either the accumulator tank 12 or the storage tank 14 has reached an almost filled condition. If the accumulator tank 12 has filled, it may be necessary to turn off the vacuum pump 16 or to perform maintenance on the gate valve 72 or the check valve 26 situated in the transfer conduit 20*c*. To clean or otherwise perform maintenance on the ball check valve 26, the gate valve 72 may be closed and the removable cap 62 may be removed to gain access to the ball 50 and the interior of the housing 52. The ball 50 and the interior of the housing 52 may be cleaned or the ball 50 may be replaced. Afterward, the ball check valve 26 may be reassembled and the gate valve 72 may be opened.

Method of Use.

In another aspect, the present invention provides a method of collecting, containing and transporting dental waste that includes at least partial separation, containment and transportation of contaminants and fluid dental waste. In one embodiment, the method includes the steps of: (a) passing fluid dental waste through a treatment stage to remove and contain at least a portion of the contaminants suspended in the fluid dental waste; (b) routing the fluid dental waste with reduced contaminants to a fluid containment reservoir; (c) periodically removing the accumulated fluid dental waste from the containment reservoir and transporting the fluid dental waste to an offsite facility for treatment and/or disposal; and (d) periodically removing the accumulated contaminants from the treatment stage and transporting the accumulated contaminants separately from the accumulated fluid dental waste to an offsite facility for treatment and/or disposal.

In this embodiment, a transport vehicle, such as a truck with a containment vessel may travel to the dental facility to collect the accumulated fluid dental waste. The transport vehicle may transport the collected liquid waste to a remote facility for treatment, reclamation and/or disposal. The containment vessel may be a tank mounted to or pulled behind the truck. The truck may include a pump to withdraw the fluid dental waste from storage or move it into the tank. For example, as noted above, the dental waste containment system 10 may include a disposal conduit 20*f* that is connected toward to the storage tank 14 and is accessible from outside the dental facility. The pump may be connected to the disposal conduit 20*f* and used to pump the accumulated liquid dental waste into the containment vessel. Alternatively, the dental waste containment system may have a pump to expel the waste into the truck containment vessel.

A transport vehicle may also be used to transport the settling canister or the contents of the settling canister separately from the accumulated liquid dental waste. Because the accumulated solids are likely to have a materially higher contaminant level than the accumulated liquid In the illustrated embodiment, the treatment stage 18 includes a settling canister 22 and the step of passing the fluid dental waste through a treatment stage 18 includes passing raw fluid dental waste through the settling canister 22, whereby at least a portion of the contaminants suspended in the raw fluid dental waste settle out of the fluid and accumulate in the canister 22, and passing the effluent of the settling canister 22 to the accumulator tank 12 and eventually to the storage tank 14 for storage separate from the accumulated solids.

As noted above, the dental waste containment system 10 may include a bypass subcircuit 26 that allows dental waste to bypass the treatment stage 18 as it is drawn into the accumulator tank 12. This feature facilitates removal and replacement (or cleaning) of the treatment stage 18 while the dental waste containment system 10 is still operating. For example, the method may include the additional steps of: (a) periodically causing the raw fluid dental waste to bypass the treatment stage; (b) servicing and/or replacing the treatment stage or a component of the treatment stage while the dental waste containment system continues to operate with the raw fluid dental waste bypassing the treatment stage. In the context of the illustrated embodiment, the bypass subcircuit may be moved into the bypass mode to allow fluid dental waste to be drawn from the dental waste sources directly into the accumulator tank 12 bypassing the settling canister. The settling canister 22 may then be removed and replaced with an empty settling canister 22. For example, the canister inlet line and the canister outlet line may be removed from the settling canister 22 and reconnected to a new canister 22. The partially filled canister 22 can then be transported by transport vehicle to a remote facility for treatment, reclamation and/or disposal. As an alternative to replacing the settling canister 22, the canister 22 may be opened and the solids may be cleaned from the canister 22. The cleaned canister 22 may be left in place in the dental waste containment system 10 and the removed solids may be transported to a remote facility for treatment, reclamation and/or disposal.

The method of the present invention provides enhanced consistency with typical government regulations concerning the transportation of contaminated waste. Because at least a portion of the solid contaminants are removed, the accumulated liquid dental waste contained in the transport vehicle will have a materially lower contaminant level and will be more suitable for vehicle transportation in higher volume. Also, the accumulated solids in the settling canister, which have a materially higher contamination level than the liquid waste, will be transported in a separate transport vehicle at much lower volumes suitable for materials with higher contaminant level. In addition to potentially improving compliance with governmental regulations, the removal of solids from the liquid dental waste also improves the function, reliability and service life of the system 10. More specifically, the removal of solids reduces the risk that the check valve 26 will become clogged or otherwise have its function impaired by the solids. For example, without the settling canister 22, the liquid dental waste includes a much higher level of suspended solids that could accumulate on and around the ball seat 60 or on the surface of the ball 50. The accumulation of solids could interfere with the ability of the ball 50 to properly seat in the ball seat 60, which could, in turn, prevent the transfer conduit 20d from closing properly when the vacuum source 16 is operating.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A dental waste containment system comprising:
   an inlet conduit configured to deliver fluid dental waste;
   a fluid reservoir coupled to the inlet conduit, the fluid reservoir configured to store fluid dental waste;
   a vacuum source coupled to the fluid reservoir to draw fluid dental waste into the fluid reservoir via the inlet conduit;
   a settling canister disposed between the inlet conduit and the fluid reservoir, the settling canister having a fluid capacity providing sufficient dwell time for at least a portion of any solids in the fluid dental waste to settle out of the fluid waste and accumulate in the settling canister;
   a bypass subcircuit selectively operable between an open position in which fluid dental waste drawn into the fluid reservoir flows through the settling canister and a bypass position in which fluid dental waste drawn into the fluid reservoir bypasses the settling canister, the bypass circuit including a bypass valve coupled to the inlet conduit, the fluid reservoir and the settling canister, the bypass valve being a three-way valve including a first inlet, a second inlet and an outlet, the inlet conduit and the canister inlet line coupled to the first inlet, the outlet coupled to the fluid reservoir, the bypass circuit including a canister inlet line and a valve for selectively closing the canister inlet line, the bypass circuit including a canister return line coupled between the settling canister and the second inlet;
   wherein said fluid reservoir includes an accumulator tank and a storage tank connected in series, the vacuum source coupled to the accumulator tank to draw fluid dental waste into the accumulator tank through the settling canister when the bypass subcircuit is in the closed position; and
   wherein the accumulator tank is coupled to the storage tank by a transfer conduit, the transfer conduit extending at an angle of at least 25 degrees from horizontal and including a ball check valve, the ball check valve being arranged to close the transfer conduit in response to a pressure differential between the accumulator tank and the storage tank created by operation of the vacuum source and to open the transfer conduit in the absence of the pressure differential.

2. The system of claim 1 wherein the ball check valve includes a generally y-shaped housing with an inlet portion, an outlet portion and a ball portion, the inlet portion coupled to the accumulator tank, the outlet portion coupled to the storage tank, the inlet portion and the outlet portion cooperatively defining a generally linear flow-path.

* * * * *